US011528851B2

(12) United States Patent
Hunter et al.

(10) Patent No.: US 11,528,851 B2
(45) Date of Patent: Dec. 20, 2022

(54) INDOOR GARDEN CENTER WITH A MOISTURE MANAGEMENT SYSTEM

(71) Applicant: Haier US Appliance Solutions, Inc., Wilmington, DE (US)

(72) Inventors: Matthew R. Hunter, Louisville, KY (US); Michael Goodman Schroeder, Louisville, KY (US); Louis A. Wantland, Louisville, KY (US); John Alexander Gardner, Louisville, KY (US); Brian Allgeier, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 22 days.

(21) Appl. No.: 17/090,262

(22) Filed: Nov. 5, 2020

(65) Prior Publication Data

US 2022/0132751 A1    May 5, 2022

(51) Int. Cl.
*A01G 9/02* (2018.01)
*A01G 9/24* (2006.01)
*A01G 9/029* (2018.01)

(52) U.S. Cl.
CPC .............. *A01G 9/246* (2013.01); *A01G 9/023* (2013.01); *A01G 9/027* (2013.01); *A01G 9/0297* (2018.02)

(58) Field of Classification Search
CPC ...... A01G 9/246; A01G 9/0297; A01G 9/023; A01G 9/027; A01G 9/247
See application file for complete search history.

(56) References Cited

U.S. PATENT DOCUMENTS

| 4,567,732 | A | * | 2/1986 | Landstrom | A01G 9/246 47/17 |
|---|---|---|---|---|---|
| 2006/0059772 | A1 | * | 3/2006 | Brault | A01G 9/246 47/17 |
| 2015/0282440 | A1 | * | 10/2015 | Shelor | A01G 9/18 47/17 |
| 2017/0099785 | A1 | * | 4/2017 | Zimmerman | A01G 7/02 |
| 2017/0343239 | A1 | * | 11/2017 | Zunino, Jr. | F24F 13/20 |
| 2018/0125016 | A1 | * | 5/2018 | Dufresne | A01G 9/1423 |
| 2018/0177140 | A1 | * | 6/2018 | Gallant | A01G 9/24 |
| 2018/0288954 | A1 | * | 10/2018 | Glaser | F24F 3/147 |
| 2019/0037780 | A1 | * | 2/2019 | Hutto | F24F 1/0076 |
| 2019/0059241 | A1 | * | 2/2019 | Bogner | A01G 9/24 |

(Continued)

FOREIGN PATENT DOCUMENTS

| CN | 104913538 A | * | 9/2015 |
|---|---|---|---|
| CN | 105052597 A | | 11/2015 |
| WO | WO2011135752 A1 | | 11/2011 |

(Continued)

*Primary Examiner* — Monica L Perry
(74) *Attorney, Agent, or Firm* — Dority & Manning, P.A.

(57) ABSTRACT

An indoor gardening appliance includes a liner defining a grow chamber and a grow module rotatably mounted within the grow chamber for receiving a plurality of plant pods. A moisture management system includes an evaporator plenum in fluid communication with the grow chamber and a fan assembly that recirculates air from the respective grow chambers and/or the ambient environment through an evaporator positioned within the evaporator plenum. In this manner, chamber humidity may be regulated while water is extracted from the air which may be used by a hydration system to hydrate plants.

16 Claims, 14 Drawing Sheets

(56) References Cited

U.S. PATENT DOCUMENTS

| | | | |
|---|---|---|---|
| 2019/0133052 A1* | 5/2019 | Carson | A01G 9/14 |
| 2020/0137964 A1* | 5/2020 | Bouchard | H04W 4/80 |

FOREIGN PATENT DOCUMENTS

| | | | |
|---|---|---|---|
| WO | WO2016138075 A1 | 9/2016 | |
| WO | WO2019101128 A1 | 5/2019 | |
| WO | WO-2020041242 A1 * | 2/2020 | A01G 31/04 |

* cited by examiner

INDOOR GARDEN CENTER WITH A MOISTURE MANAGEMENT SYSTEM

FIELD OF THE INVENTION

The present subject matter relates generally to systems for gardening plants indoors, and more particularly, to a system and method for regulating chamber humidity and improving water management in an indoor gardening appliance.

BACKGROUND OF THE INVENTION

Conventional indoor garden centers include a cabinet defining a grow chamber having a number of trays or racks positioned therein to support seedlings or plant material, e.g., for growing herbs, vegetables, or other plants in an indoor environment. In addition, such indoor garden centers may include an environmental control system that maintains the growing chamber at a desired temperature or humidity. Certain indoor garden centers may also include hydration systems for watering the plants and/or artificial lighting systems that provide the light necessary for such plants to grow.

Conventional hydration systems for indoor gardens centers provide a flow of water and nutrients onto plants stored therein to facilitate plant growth. For example, typical garden centers have a nozzle that sprays water from a reservoir onto roots within a root chamber of a grow module or otherwise charges the root chamber with mist. Such hydration systems are typically passive, time-based hydration systems that simply turn on and off at specified times and direct mist from one location within the chamber. The humidified chamber air is often recirculated within grow chamber, such that the humidity will rise over time, while the hydration system steadily uses all the water stored in the reservoir. As a result, water usage is inefficient, and these garden centers must include high-capacity water supply and management systems.

Accordingly, an improved indoor garden center would be useful. More particularly, an indoor garden center with a hydration system and moisture management system that facilitates versatile and efficient hydration dosing would be particularly beneficial.

BRIEF DESCRIPTION OF THE INVENTION

Aspects and advantages of the invention will be set forth in part in the following description, or may be apparent from the description, or may be learned through practice of the invention.

In one exemplary embodiment, a gardening appliance is provided including a liner positioned within a cabinet and defining a grow chamber, a grow module mounted within the liner and defining a plurality of apertures for receiving one or more plant pods, and a moisture management system. The moisture management system includes an evaporator plenum in fluid communication with the grow chamber, a fan assembly operably coupled to the evaporator plenum for urging a flow of air through the evaporator plenum, and an evaporator positioned within the evaporator plenum for dehumidifying the flow of air passing through the evaporator plenum.

In another exemplary embodiment, a moisture management system for a gardening appliance is provided. The gardening appliance includes a liner positioned within a cabinet and defining a grow chamber and a grow module mounted within the liner. The moisture management system includes an evaporator plenum in fluid communication with the grow chamber, a fan assembly operably coupled to the evaporator plenum for urging a flow of air through the evaporator plenum, and an evaporator positioned within the evaporator plenum for dehumidifying the flow of air passing through the evaporator plenum.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
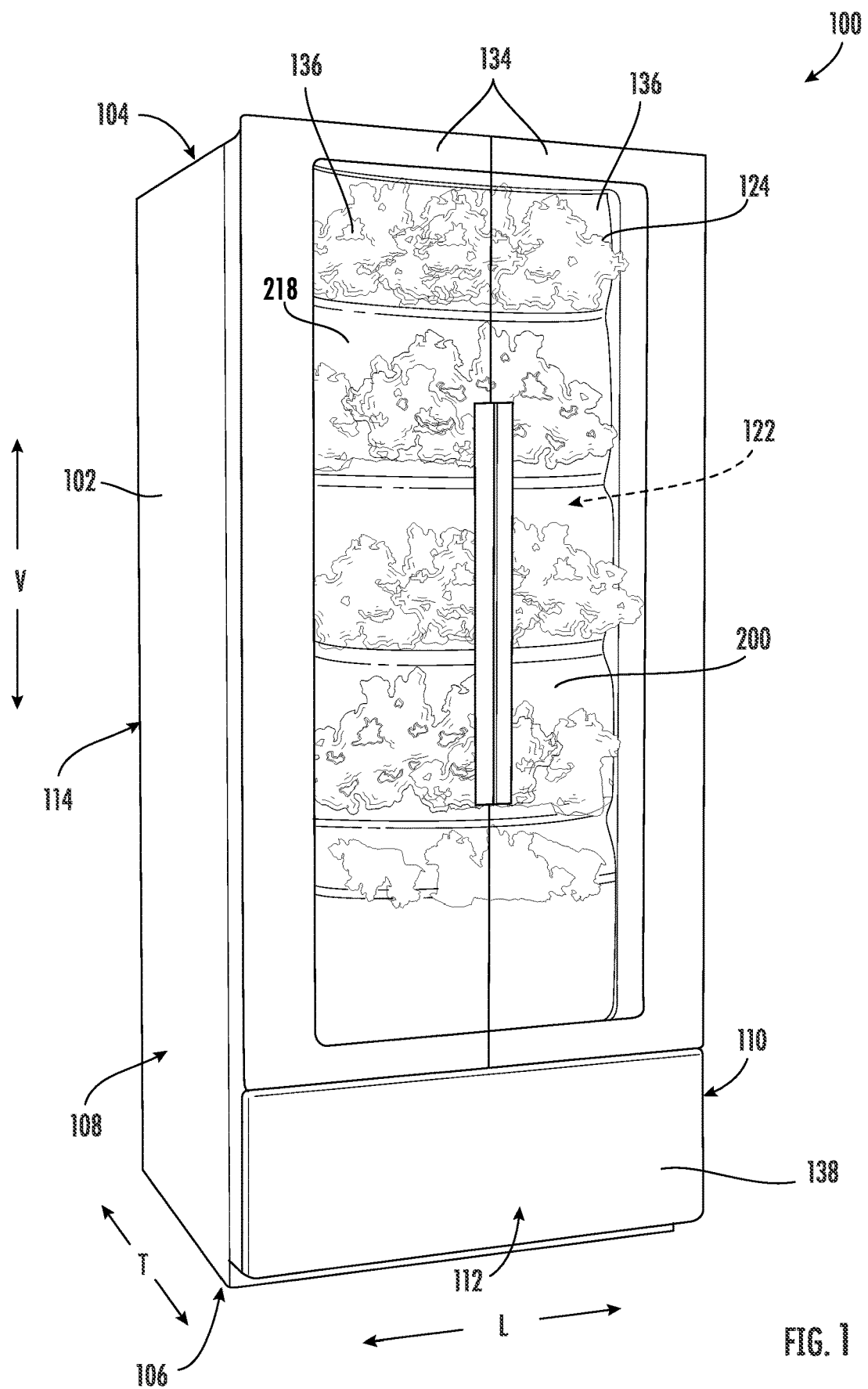
FIG. 1 provides a perspective view of a gardening appliance according to an exemplary embodiment of the present subject matter.

Repeat use of reference characters in the present specification and drawings is intended to represent the same or analogous features or elements of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, terms of approximation, such as "approximately," "substantially," or "about," refer to being within a ten percent (10%) margin of error of the stated value. Moreover, as used herein, the terms "first," "second," and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows.

FIG. 1 provides a front view of a gardening appliance 100 according to an exemplary embodiment of the present subject matter. According to exemplary embodiments, gardening appliance 100 may be used as an indoor garden center for growing plants. It should be appreciated that the embodiments described herein are intended only for explaining aspects of the present subject matter. Variations and modifications may be made to gardening appliance 100 while remaining within the scope of the present subject matter.

Gardening appliance 100 includes a housing or cabinet 102 that extends between a top 104 and a bottom 106 along a vertical direction V, between a first side 108 and a second side 110 along a lateral direction L, and between a front side 112 and a rear side 114 along a transverse direction T. Each of the vertical direction V, lateral direction L, and transverse direction T are mutually perpendicular to one another and form an orthogonal direction system.

Gardening appliance 100 may include an insulated liner 120 positioned within cabinet 102. Liner 120 may at least partially define a temperature controlled, referred to herein generally as a grow chamber 122, within which plants 124 may be grown. Although gardening appliance 100 is referred to herein as growing plants 124, it should be appreciated that other organisms or living things may be grown or stored in gardening appliance 100. For example, algae, fungi (e.g., including mushrooms), or other living organisms may be grown or stored in gardening appliance 100. The specific application described herein is not intended to limit the scope of the present subject matter.

Cabinet 102, or more specifically, liner 120 may define a substantially enclosed back region or portion 130. In addition, cabinet 102 and liner 120 may define a front opening, referred to herein as front display opening 132, through which a user of gardening appliance 100 may access grow chamber 122, e.g., for harvesting, planting, pruning, or otherwise interacting with plants 124. According to an exemplary embodiment, enclosed back portion 130 may be defined as a portion of liner 120 that defines grow chamber 122 proximate rear side 114 of cabinet 102. In addition, front display opening 132 may generally be positioned proximate or coincide with front side 112 of cabinet 102.

Figure 2:
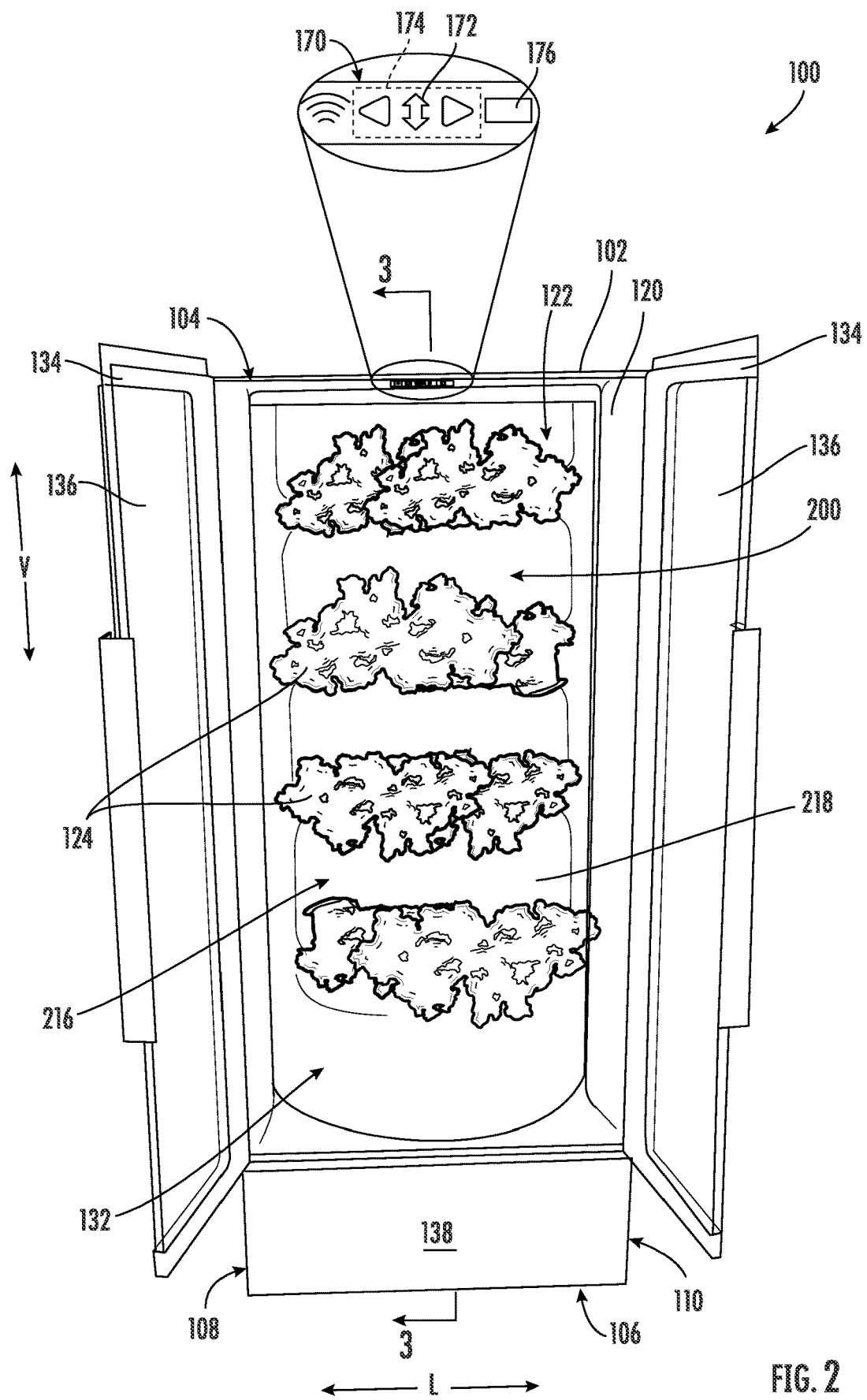
FIG. 2 depicts a front view of the exemplary gardening appliance of FIG. 1 with the doors open according to an exemplary embodiment of the present subject matter.

Gardening appliance 100 may further include one or more doors 134 that are rotatably mounted to cabinet 102 for providing selective access to grow chamber 122. For example, FIG. 1 illustrates doors 134 in the closed position such that they may help insulate grow chamber 122. By contrast, FIG. 2 illustrates doors 134 in the open positioned for accessing grow chamber 122 and plants 124 stored therein. Doors 134 may further include a transparent window 136 through which a user may observe plants 124 without opening doors 134.

Although doors 134 are illustrated as being rectangular and being mounted on front side 112 of cabinet 102 in FIGS. 1 and 2, it should be appreciated that according to alternative embodiments, doors 134 may have different shapes, mounting locations, etc. For example, doors 134 may be curved, may be formed entirely from glass, etc. In addition, doors 134 may have integral features for controlling light passing into and/or out of grow chamber 122, such as internal louvers, tinting, UV treatments, polarization, etc. One skilled in the art will appreciate that other chamber and door configurations are possible and within the scope of the present invention.

According to the illustrated embodiment, cabinet 102 further defines a drawer 138 positioned proximate bottom 106 of cabinet 102 and being slidably mounted to cabinet for providing convenient storage for plant nutrients, system accessories, water filters, etc. In addition, behind drawer 138 is a mechanical compartment 140 for receipt of an environmental control system including a sealed system for regulating the temperature within grow chamber 122, as described in more detail below.

Figure 3:
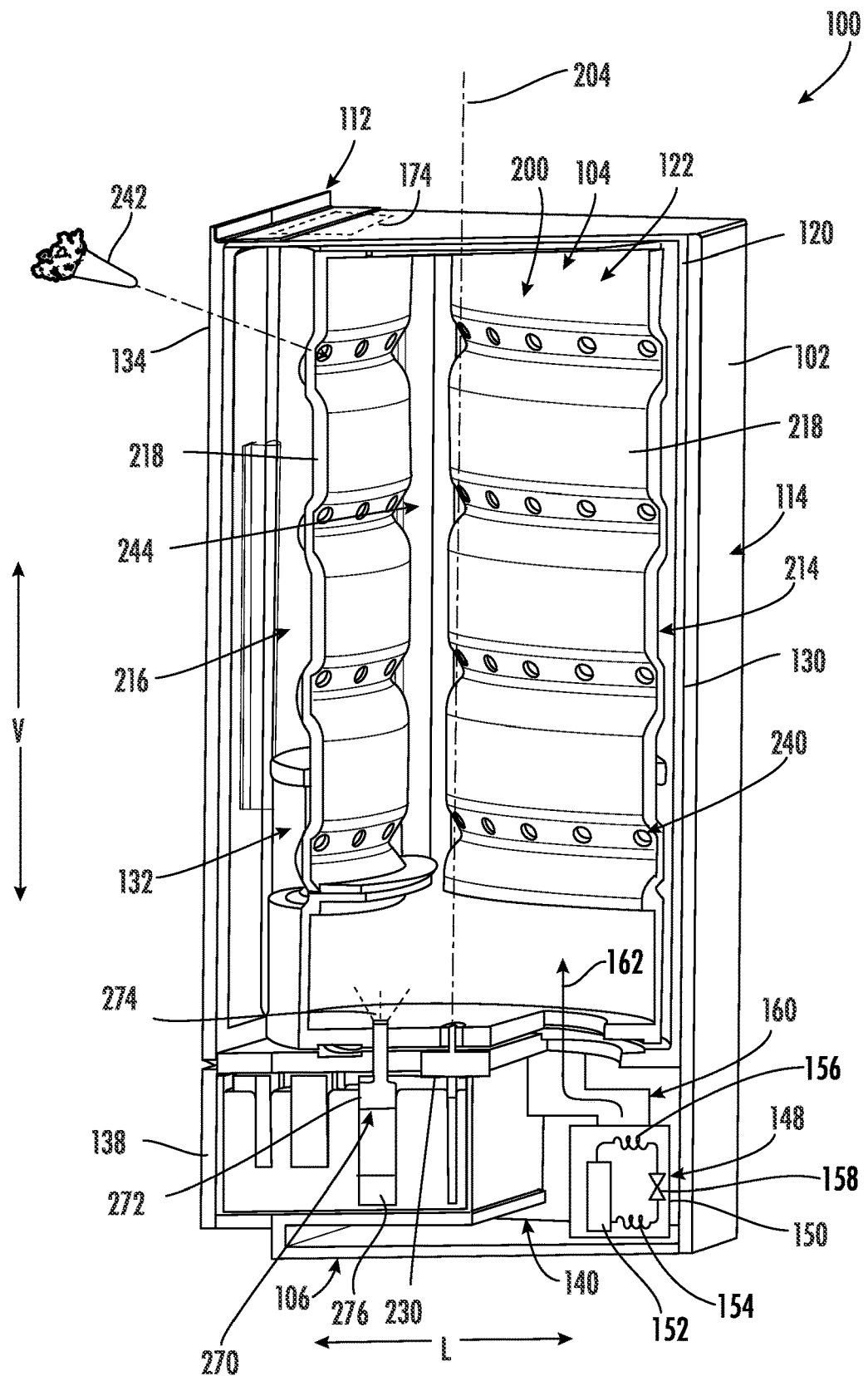
FIG. 3 is a cross sectional view of the exemplary gardening appliance of FIG. 1, taken along Line 3-3 from FIG. 2 with an internal divider removed for clarity.

FIG. 3 provides a schematic view of certain components of an environmental control system 148 that may be used to regulate a temperature within grow chamber 122. Specifically, environmental control system 148 may include a sealed system 150, a duct system 160, and a hydration system 270, or any other suitable components or subsystems for regulating an environment within grow chamber 122, e.g., for facilitating improved or regulated growth of plants 124 positioned therein. Specifically, FIG. 3 illustrates sealed system 150 within mechanical compartment 140. Although an exemplary sealed system is illustrated and described herein, it should be appreciated that variations and modifications may be made to sealed system 150 while remaining within the scope of the present subject matter. For example, sealed system 150 may include additional or alternative components, different ducting configurations, etc.

As shown, sealed system 150 includes a compressor 152, a first heat exchanger or evaporator 154 and a second heat exchanger or condenser 156. As is generally understood, compressor 152 is generally operable to circulate or urge a flow of refrigerant through sealed system 150, which may include various conduits which may be utilized to flow refrigerant between the various components of sealed system 150. Thus, evaporator 154 and condenser 156 may be between and in fluid communication with each other and compressor 152.

During operation of sealed system 150, refrigerant flows from evaporator 154 and to compressor 152, and compressor 152 is generally configured to direct compressed refrigerant from compressor 152 to condenser 156. For example, refrigerant may exit evaporator 154 as a fluid in the form of a superheated vapor. Upon exiting evaporator 154, the refrigerant may enter compressor 152, which is operable to compress the refrigerant. Accordingly, the pressure and temperature of the refrigerant may be increased in compressor 152 such that the refrigerant becomes a more superheated vapor.

Condenser 156 is disposed downstream of compressor 152 and is operable to reject heat from the refrigerant. For example, the superheated vapor from compressor 152 may enter condenser 156 and transfer energy to air surrounding condenser 156 (e.g., to create a flow of heated air). In this manner, the refrigerant condenses into a saturated liquid and/or liquid vapor mixture. A condenser fan (not shown) may be positioned adjacent condenser 156 and may facilitate or urge the flow of heated air across the coils of condenser 156 (e.g., from ambient atmosphere) in order to facilitate heat transfer.

According to the illustrated embodiment, an expansion device or a variable electronic expansion valve 158 may be further provided to regulate refrigerant expansion. During use, variable electronic expansion valve 158 may generally expand the refrigerant, lowering the pressure and temperature thereof. In this regard, refrigerant may exit condenser 156 in the form of high liquid quality/saturated liquid vapor mixture and travel through variable electronic expansion valve 158 before flowing through evaporator 154. Variable electronic expansion valve 158 is generally configured to be adjustable, e.g., such that the flow of refrigerant (e.g., volumetric flow rate in milliliters per second) through variable electronic expansion valve 158 may be selectively varied or adjusted.

Evaporator 154 is disposed downstream of variable electronic expansion valve 158 and is operable to heat refrigerant within evaporator 154, e.g., by absorbing thermal energy from air surrounding the evaporator (e.g., to create a flow of cooled air). For example, the liquid or liquid vapor mixture refrigerant from variable electronic expansion valve 158 may enter evaporator 154. Within evaporator 154, the refrigerant from variable electronic expansion valve 158 receives energy from the flow of cooled air and vaporizes into superheated vapor and/or high quality vapor mixture. An air handler or evaporator fan (not shown) is positioned adjacent evaporator 154 and may facilitate or urge the flow of cooled air across evaporator 154 in order to facilitate heat transfer. From evaporator 154, refrigerant may return to compressor 152 and the vapor-compression cycle may continue.

As explained above, environmental control system 148 includes a sealed system 150 for providing a flow of heated air or a flow cooled air throughout grow chamber 122 as needed. To direct this air, environmental control system 148 includes a duct system 160 for directing the flow of temperature regulated air, identified herein simply as flow of air 162 (see, e.g., FIG. 3). In this regard, for example, an evaporator fan can generate a flow of cooled air as the air passes over evaporator 154 and a condenser fan can generate a flow of heated air as the air passes over condenser 156.

These flows of air 162 are routed through a cooled air supply duct and/or a heated air supply duct (not shown), respectively. In this regard, it should be appreciated that environmental control system 148 may generally include a plurality of ducts, dampers, diverter assemblies, and/or air handlers to facilitate operation in a cooling mode, in a heating mode, in both a heating and cooling mode, or any other mode suitable for regulating the environment within grow chamber 122. It should be appreciated that duct system 160 may vary in complexity and may regulate the flows of air from sealed system 150 in any suitable arrangement through any suitable portion of grow chamber 122.

Gardening appliance 100 may include a control panel 170. Control panel 170 includes one or more input selectors 172, such as e.g., knobs, buttons, push buttons, touchscreen interfaces, etc. In addition, input selectors 172 may be used to specify or set various settings of gardening appliance 100, such as e.g., settings associated with operation of sealed system 150. Input selectors 172 may be in communication with a processing device or controller 174. Control signals generated in or by controller 174 operate gardening appliance 100 in response to input selectors 172. Additionally, control panel 170 may include a display 176, such as an indicator light or a screen. Display 176 is communicatively coupled with controller 174 and may display information in response to signals from controller 174. Further, as will be described herein, controller 174 may be communicatively coupled with other components of gardening appliance 100, such as e.g., one or more sensors, motors, or other components.

As used herein, "processing device" or "controller" may refer to one or more microprocessors or semiconductor devices and is not restricted necessarily to a single element. The processing device can be programmed to operate gardening appliance 100. The processing device may include, or be associated with, one or more memory elements (e.g., non-transitory storage media). In some such embodiments, the memory elements include electrically erasable, programmable read only memory (EEPROM). Generally, the memory elements can store information accessible processing device, including instructions that can be executed by processing device. Optionally, the instructions can be software or any set of instructions and/or data that when executed by the processing device, cause the processing device to perform operations.

Referring now generally to FIGS. 1 through 8, gardening appliance 100 generally includes a rotatable carousel, referred to herein as a grow module 200 that is mounted within liner 120, e.g., such that it is within grow chamber 122. As illustrated, grow module 200 includes a central hub 202 that extends along and is rotatable about a central axis 204. Specifically, according to the illustrated embodiment, central axis 204 is parallel to the vertical direction V. However, it should be appreciated that central axis 204 could alternatively extend in any suitable direction, e.g., such as the horizontal direction. In this regard, grow module 200 generally defines an axial direction, i.e., parallel to central axis 204, a radial direction R that extends perpendicular to central axis 204, and a circumferential direction C that extends around central axis 204 (e.g. in a plane perpendicular to central axis 204).

Grow module 200 may further include a plurality of partitions 206 that extend from central hub 202 substantially along the radial direction R. In this manner, grow module 200 defines a plurality of chambers, referred to herein generally by reference numeral 210, by dividing or partitioning grow chamber 122. Referring specifically to a first embodiment of grow module 200 illustrated in FIGS. 1 through 8, grow module 200 includes three partitions 206 to define a first chamber 212, a second chamber 214, and a third chamber 216, which are circumferentially spaced relative to each other. In general, as grow module 200 is rotated within grow chamber 122, the plurality of chambers 210 define substantially separate and distinct growing environments, e.g., for growing plants 124 having different growth needs.

More specifically, partitions 206 may extend from central hub 202 to a location immediately adjacent liner 120. Although partitions 206 are described as extending along the radial direction, it should be appreciated that they need not be entirely radially extending. For example, according to the illustrated embodiment, the distal ends of each partition is joined with an adjacent partition using an arcuate wall 218, which is generally used to support plants 124.

Notably, it is desirable according to exemplary embodiments to form a substantial seal between partitions 206 and liner 120. Therefore, according to an exemplary embodiment, grow module 200 may define a grow module diameter 220 (e.g., defined by its substantially circular footprint formed in a horizontal plane). Similarly, enclosed back portion 130 of liner 120 may be substantially cylindrical and may define a liner diameter 222. In order to prevent a significant amount of air from escaping between partitions 206 and liner 120, liner diameter 222 may be substantially equal to or slightly larger than grow module diameter 220.

Referring now specifically to FIG. 3, gardening appliance 100 may further include a motor 230 or another suitable driving element or device for selectively rotating grow module 200 during operation of gardening appliance 100. In this regard, according to the illustrated embodiment, motor 230 is positioned below grow module 200, e.g., within mechanical compartment 140, and is operably coupled to grow module 200 along central axis 204 for rotating grow module 200.

As used herein, "motor" may refer to any suitable drive motor and/or transmission assembly for rotating grow module 200. For example, motor 230 may be a brushless DC electric motor, a stepper motor, or any other suitable type or configuration of motor. For example, motor 230 may be an AC motor, an induction motor, a permanent magnet synchronous motor, or any other suitable type of AC motor. In addition, motor 230 may include any suitable transmission assemblies, clutch mechanisms, or other components.

According to an exemplary embodiment, motor 230 may be operably coupled to controller 174, which is programmed to rotate grow module 200 according to predetermined operating cycles, based on user inputs (e.g. via touch buttons 172), etc. In addition, controller 174 may be communicatively coupled to one or more sensors, such as temperature or humidity sensors, positioned within the various chambers 210 for measuring temperatures and/or humidity, respectively. Controller 174 may then operate motor 230 in order to maintain desired environmental conditions for each of the respective chambers 210. For example, as will be described in more detail below, gardening appliance 100 includes features for providing certain locations of gardening appliance 100 with light, temperature control, proper moisture, nutrients, and other requirements for suitable plant growth. Motor 230 may be used to position specific chambers 210 where needed to receive such growth requirements.

According to an exemplary embodiment, such as where three partitions 206 form three chambers 212-216, controller 174 may operate motor 230 to index grow module 200 sequentially through a number of preselected positions. More specifically, motor 230 may rotate grow module 200 in a counterclockwise direction (e.g. when viewed from a top of grow module 200) in 120° increments to move chambers 210 between sealed positions and display positions. As used herein, a chamber 210 is considered to be in a "sealed position" when that chamber 210 is substantially sealed between grow module 200 (i.e., central hub 202 and adjacent partitions 206) and liner 120. By contrast, a chamber 210 is considered to be in a "display position" when that chamber 210 is at least partially exposed to front display opening 132, such that a user may access plants 124 positioned within that chamber 210.

Figure 4:
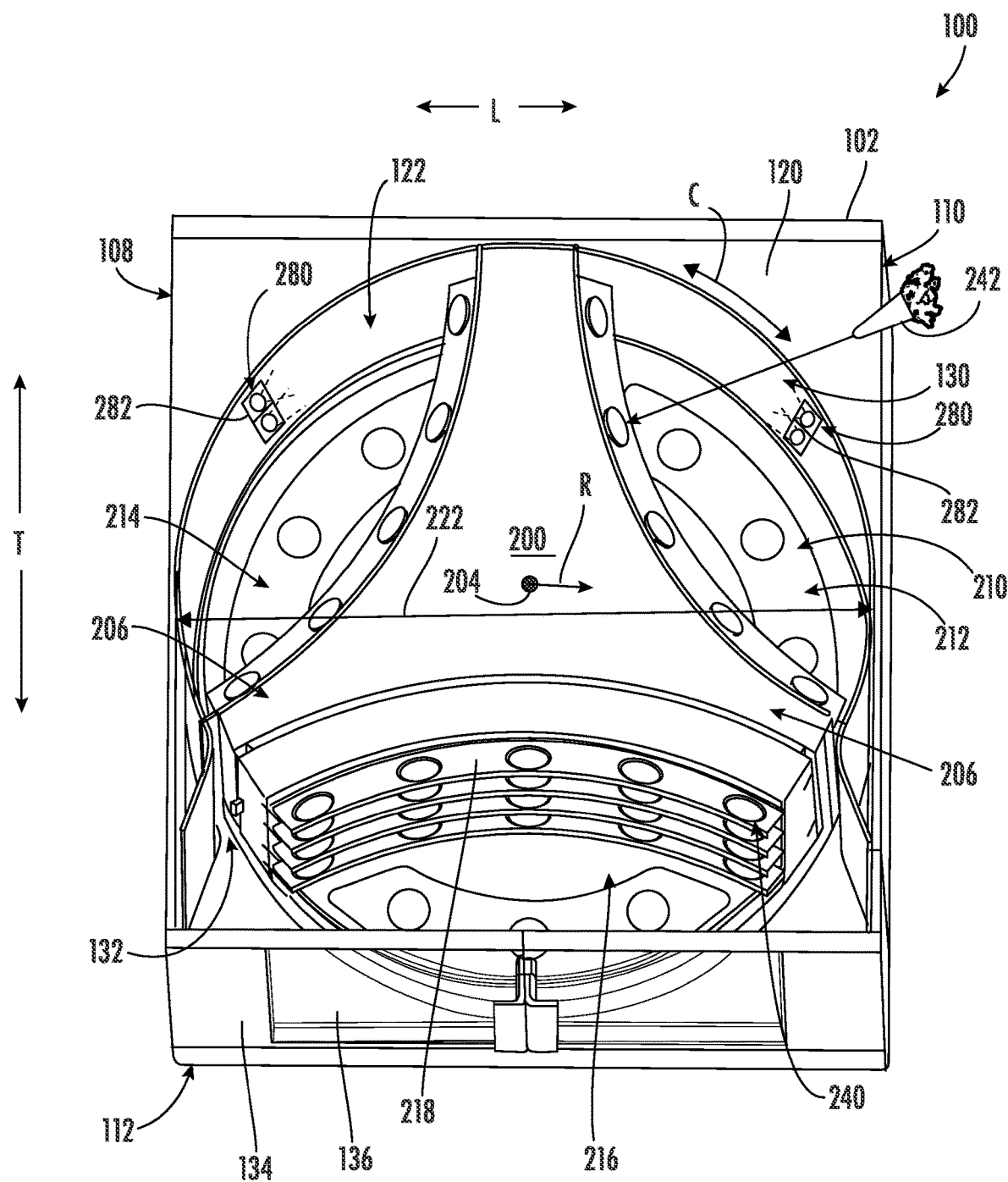
FIG. 4 is a top perspective view of the exemplary gardening appliance of FIG. 1, with the top panel of the cabinet removed to reveal a rotatable grow module according to an exemplary embodiment of the present subject matter.
Figure 5:
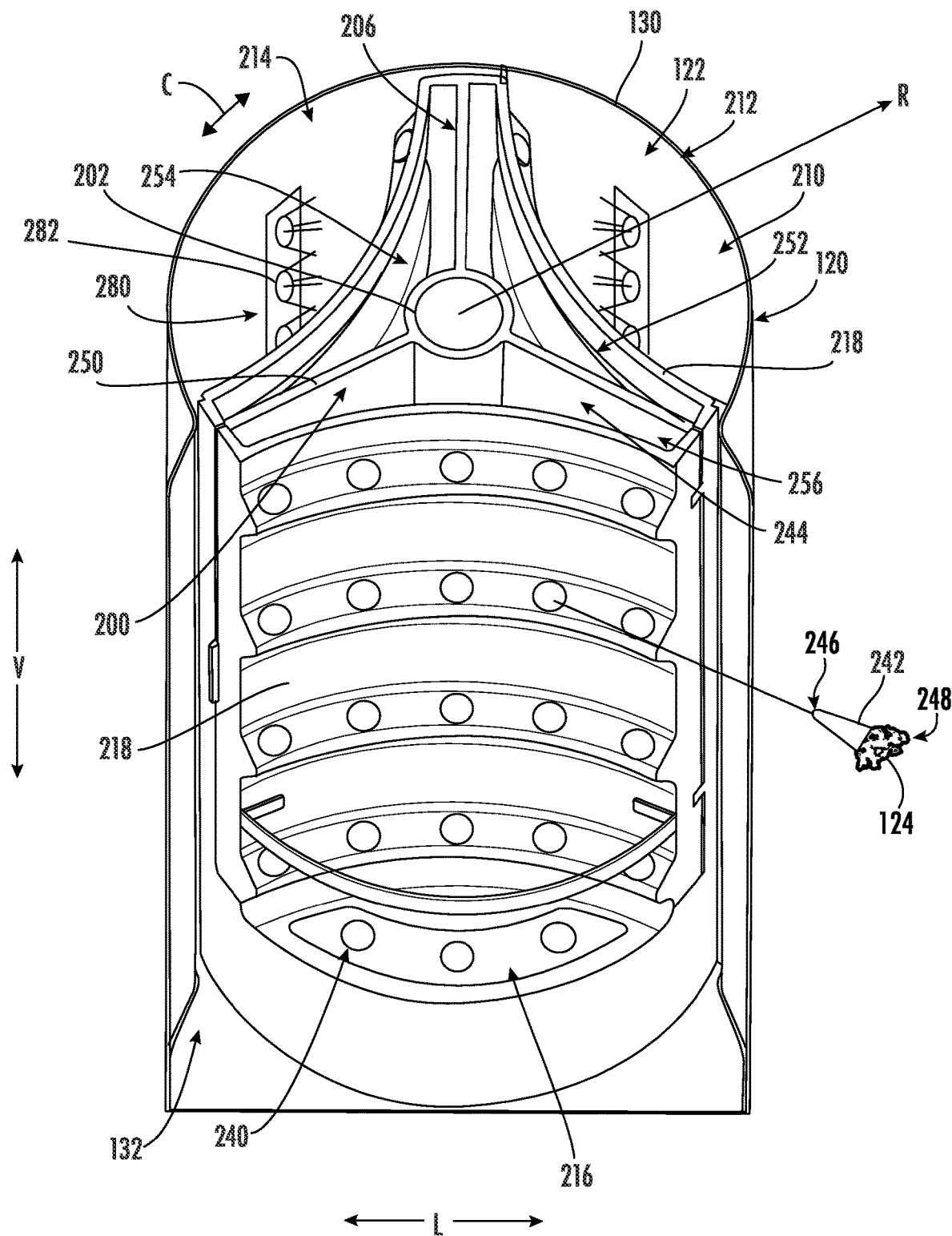
FIG. 5 provides a perspective cross sectional view of the exemplary gardening appliance of FIG. 1 according to another exemplary embodiment of the present subject matter.
Figure 6:
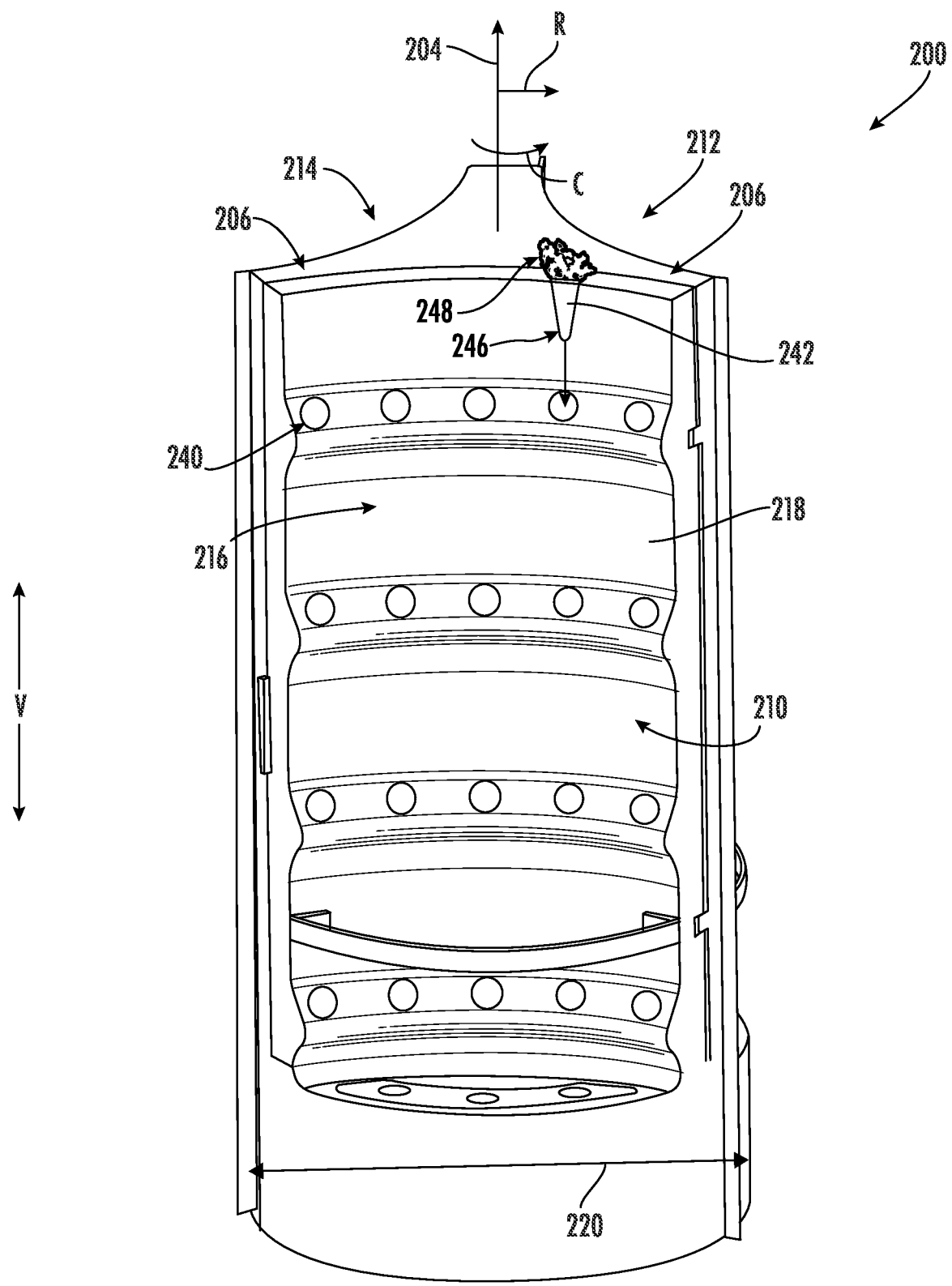
FIG. 6 provides a perspective view of the grow module of the exemplary gardening appliance of FIG. 1 according to another exemplary embodiment of the present subject matter.

For example, as illustrated in FIGS. 4 and 5, first chamber 212 and second chamber 214 are both in a sealed position, whereas third chamber 216 is in a display position. As motor 230 rotates grow module 200 by 120 degrees in the counterclockwise direction, second chamber 214 will enter the display position, while first chamber 212 and third chamber 216 will be in the sealed positions. Motor 230 may continue to rotate grow module 200 in such increments to cycle grow chambers 210 between these sealed and display positions.

Referring now generally to FIGS. 4 through 8, grow module 200 will be described in more detail according to an exemplary embodiment of the present subject matter. As shown, grow module 200 defines a plurality of apertures 240 which are generally configured for receiving plant pods 242 into an internal root chamber 244. Plant pods 242 generally contain seedlings or other material for growing plants positioned within a mesh or other support structure through which roots of plants 124 may grow within grow module 200. A user may insert a portion of plant pod 242 (e.g., a seed end or root end 246) having the desired seeds through one of the plurality of apertures 240 into root chamber 244. A plant end 248 of the plant pod 242 may remain within grow chamber 210 such that plants 124 may grow from grow module 200 such that they are accessible by a user. In this regard, grow module 200 defines root chamber 244, e.g., within at least one of central hub 202 and the plurality of partitions 206. As will be explained below, water and other nutrients may be supplied to the root end 246 of plant pods 242 within root chamber 244. Notably, apertures 240 may be covered by a flat flapper seal (not shown) to prevent water from escaping root chamber 244 when no plant pod 242 is installed.

Figure 7:
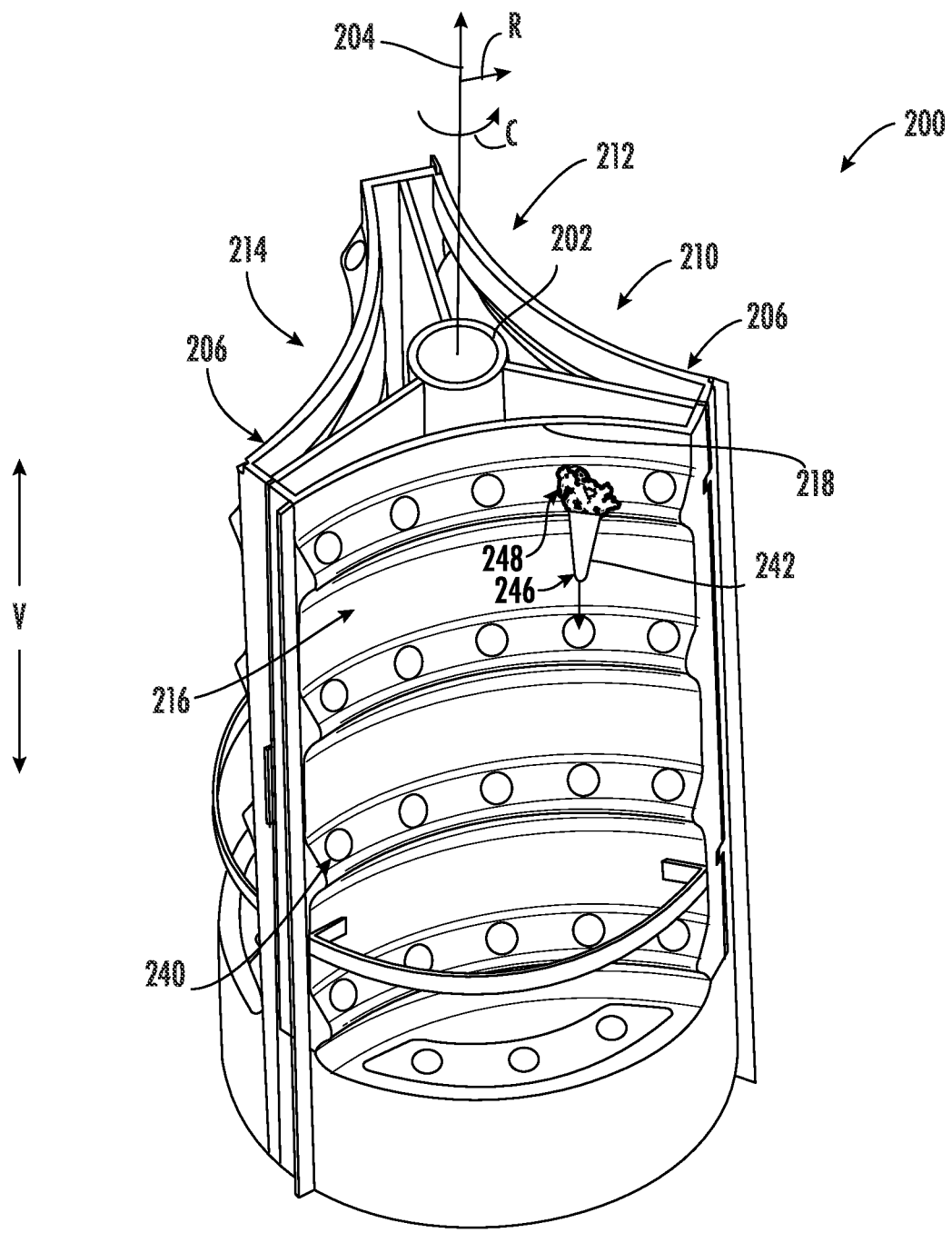
FIG. 7 provides a perspective cross sectional view of the exemplary grow module of FIG. 6 according to another exemplary embodiment of the present subject matter.
Figure 8:
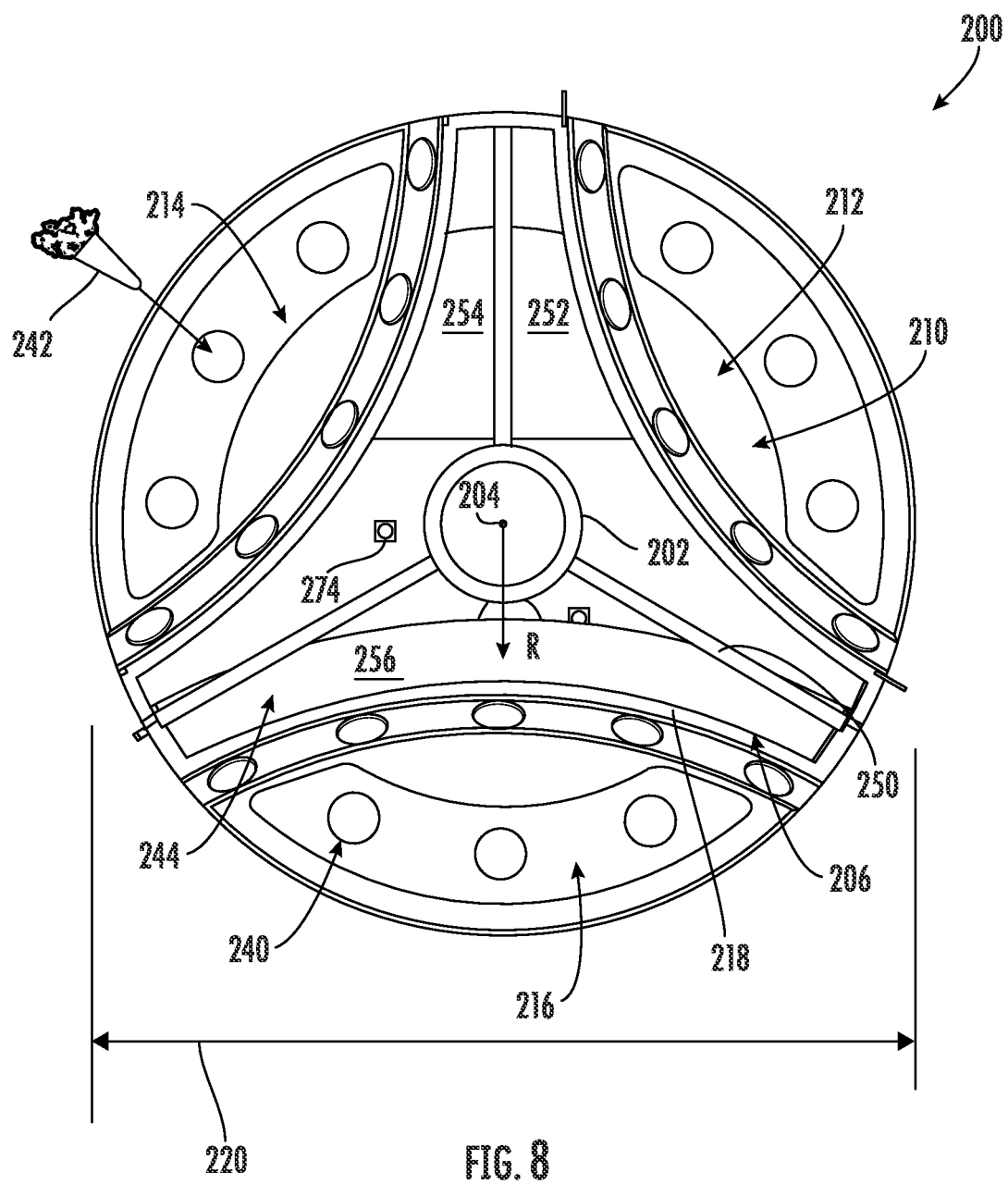
FIG. 8 provides a top cross-sectional view of the exemplary grow module of FIG. 6 according to another exemplary embodiment of the present subject matter.

As best shown in FIGS. 5 and 7, grow module 200 may further include an internal divider 250 that is positioned within root chamber 244 to divide root chamber 244 into a plurality of root chambers, each of the plurality of root chambers being in fluid communication with one of the plurality of grow chambers 210 through the plurality of apertures 240. More specifically, according to the illustrated embodiment, internal divider 250 may divide root chamber 244 into a first root chamber 252, a second root chamber 254, and a third root chamber 256. According to an exemplary embodiment, first root chamber 252 may provide water and nutrients to plants 124 positioned in the first grow chamber 212, second root chamber 254 may provide water and nutrients to plants 124 positioned in the second grow chamber 214, and third root chamber 256 may provide water and nutrients to plants 124 positioned in the third grow chamber 216. In this manner, environmental control system 148 may control the temperature and/or humidity of each of the plurality of chambers 212-216 and the plurality of root chambers 252-256 independently of each other.

Environmental control system 148 may further include a hydration system 270 which is generally configured for providing water to plants 124 to support their growth. Specifically, according to the illustrated embodiment, hydration system 270 generally includes a water supply 272 and misting device 274 (e.g., such as a fine mist spray nozzle or nozzles). For example, water supply 272 may be a reservoir containing water (e.g., distilled water) or may be a direct connection municipal water supply. According to exemplary embodiments, hydration system 270 may include one or more pumps 276 (see FIG. 15) for providing a flow of liquid nutrients to misting device 274. In this regard, for example, water or nutrients that are not absorbed by roots of plants 124 may fall under the force of gravity into a sump 278. Pump 276 may be fluidly coupled to sump 278 to recirculate the water through misting device 274.

Misting device 274 may be positioned at a bottom of root chamber 244 and may be configured for charging root chamber 244 with mist for hydrating the roots of plants 124. Alternatively, misting devices 274 may pass through central hub 204 along the vertical direction V and periodically include a nozzle for spraying a mist or water into root chamber 244. Because various plants 124 may require different amounts of water for desired growth, hydration system 270 may alternatively include a plurality of misting devices 274, e.g., all coupled to water supply 272, but being selectively operated to charge each of first root chamber 252, second root chamber 254, and third root chamber 256 independently of each other.

Notably, environmental control system 148 described above is generally configured for regulating the temperature and humidity (e.g., or some other suitable water level quantity or measurement) within one or all of the plurality of chambers 210 and/or root chambers 252-256 independently of each other. In this manner, a versatile and desirable growing environment may be obtained for each and every chamber 210.

Referring now for example to FIGS. 4 and 5, gardening appliance 100 may further include a light assembly 280 which is generally configured for providing light into selected grow chambers 210 to facilitate photosynthesis and growth of plants 124. As shown, light assembly 280 may include a plurality of light sources 282 stacked in an array, e.g., extending along the vertical direction V. For example, light sources 282 may be mounted directly to liner 120 within grow chamber 122, or may alternatively be positioned behind liner 120 such that light is projected through a transparent window or light pipe into grow chamber 122. The position, configuration, and type of light sources 282 described herein are not intended to limit the scope of the present subject matter in any manner.

Light sources 282 may be provided as any suitable number, type, position, and configuration of electrical light source(s), using any suitable light technology and illuminating in any suitable color. For example, according to the illustrated embodiment, light source 282 includes one or more light emitting diodes (LEDs), which may each illuminate in a single color (e.g., white LEDs), or which may each illuminate in multiple colors (e.g., multi-color or RGB LEDs) depending on the control signal from controller 174. However, it should be appreciated that according to alternative embodiments, light sources 282 may include any other suitable traditional light bulbs or sources, such as halogen bulbs, fluorescent bulbs, incandescent bulbs, glow bars, a fiber light source, etc.

Notably, light sources 282 may generate a considerable amount of heat during operation. As a result, it may be desirable that gardening appliance 100 include systems for cooling light assembly 280. Referring briefly to FIGS. 9 through 14, gardening appliance 100 may include a light cooling duct 284 and a cooling fan 286 for urging a flow of cooling air through the light cooling duct 284 to cool light sources 282. For example, each light assembly (e.g., in first chamber 212 and second chamber 214) may include a separate light cooling duct 284 within which the control electronics or a portion of light sources 282 may be positioned. In this manner, cooling fans 286 may be selectively operated to urge a flow of cooling air from their respective grow chambers 212, 214 over light sources 282 to maintain suitable operating temperature.

As explained above, light generated from light assembly 280 may result in light pollution within a room where gardening appliance 100 is located. Therefore, aspects of the present subject matter are directed to features for reducing light pollution, or to the blocking of light from light sources 282 through front display opening 132. Specifically, as illustrated, light assembly 280 is positioned only within the enclosed back portion 130 of liner 120 such that only grow chambers 210 which are in a sealed position are exposed to light from light sources 282. Specifically, grow module 200 acts as a physical partition between light assemblies 280 and front display opening 132. In this manner, as illustrated in FIG. 5, no light may pass from first chamber 212 or second chamber 214 through grow module 200 and out front display opening 132. As grow module 200 rotates, two of the three grow chambers 210 will receive light from light assembly 280 at a time. According still other embodiments, a single light assembly may be used to reduce costs, whereby only a single grow chamber 210 will be lit at a single time.

Gardening appliance 100 and grow module 200 have been described above to explain an exemplary embodiment of the present subject matter. However, it should be appreciated that variations and modifications may be made while remaining within the scope of the present subject matter. For example, according to alternative embodiments, gardening appliance 100 may be a simplified to a two-chamber embodiment with a square liner 120 and a grow module 200 having two partitions 206 extending from opposite sides of central hub 202 to define a first grow chamber and a second grow chamber. According to such an embodiment, by rotating grow module 200 by 180 degrees about central axis 206, the first chamber may alternate between the sealed position (e.g., facing rear side 114 of cabinet 102) and the display position (e.g., facing front side 112 of cabinet 102). By contrast, the same rotation will move the second chamber from the display position to the sealed position.

According to still other embodiments, gardening appliance 100 may include a three chamber grow module 200 but may have a modified cabinet 102 such that front display opening 132 is wider and two of the three grow chambers 210 are displayed at a single time. Thus, first chamber 212 may be in the sealed position, while second chamber 214 and third chamber 216 may be in the display positions. As grow module 200 is rotated counterclockwise, first chamber 212 is moved into the display position and third chamber 216 is moved into the sealed position.

Referring now to FIGS. 9 through 15, a moisture management system 300 will be described according to an exemplary embodiment of the present subject matter. In general, moisture management system 300 may be used to regulate the distribution of moisture, hydration, water, etc. throughout gardening appliance 100 to improve water usage and efficiency, to facilitate independent hydration of different sections of grow chamber 122, or to otherwise regulate the humidity or moisture content throughout gardening appliance 100.

Figure 9:
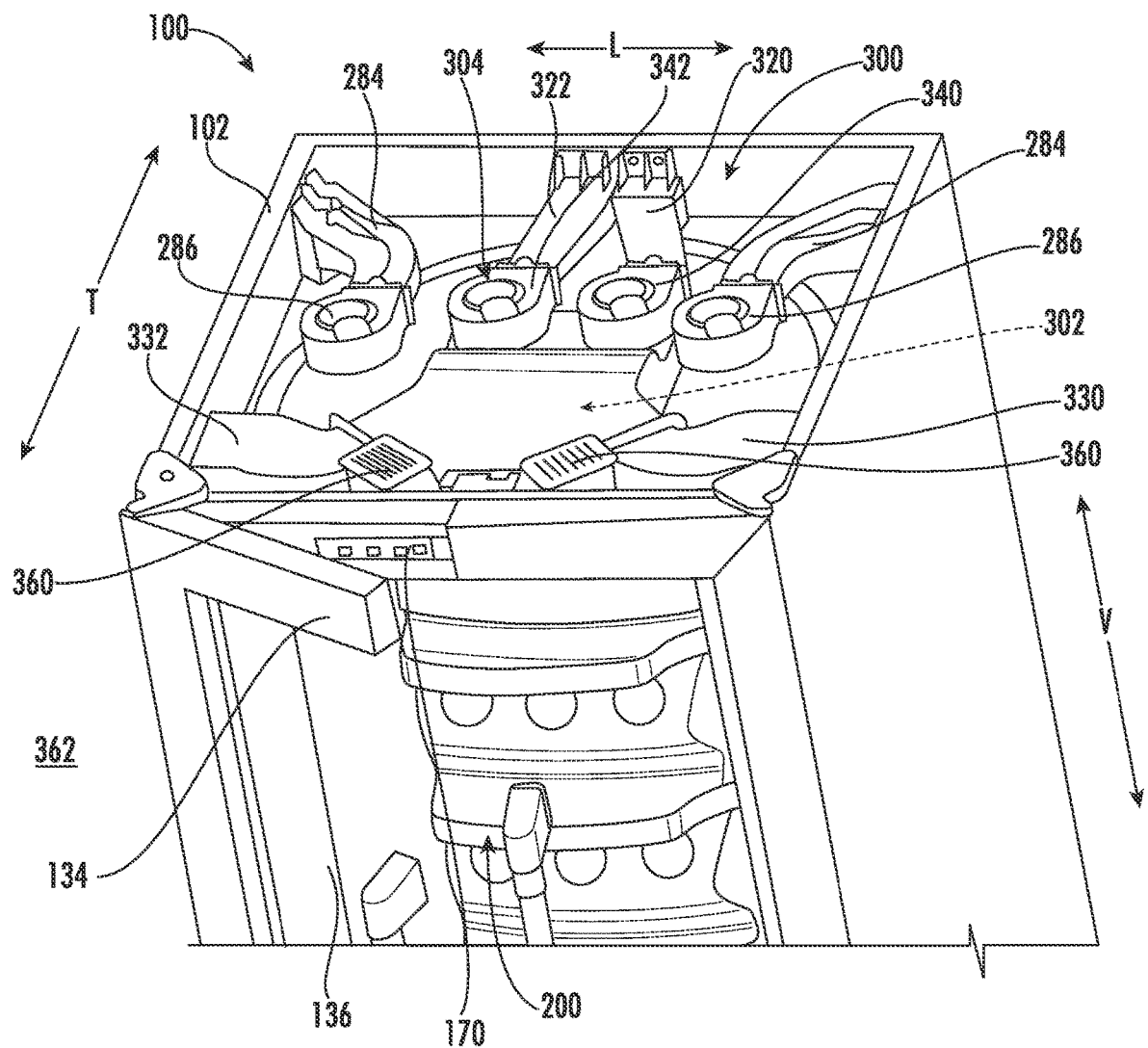
FIG. 9 provides a front perspective view of a moisture management system that may be used with the exemplary gardening appliance of FIG. 1 according to an exemplary embodiment of the present subject matter.
Figure 10:
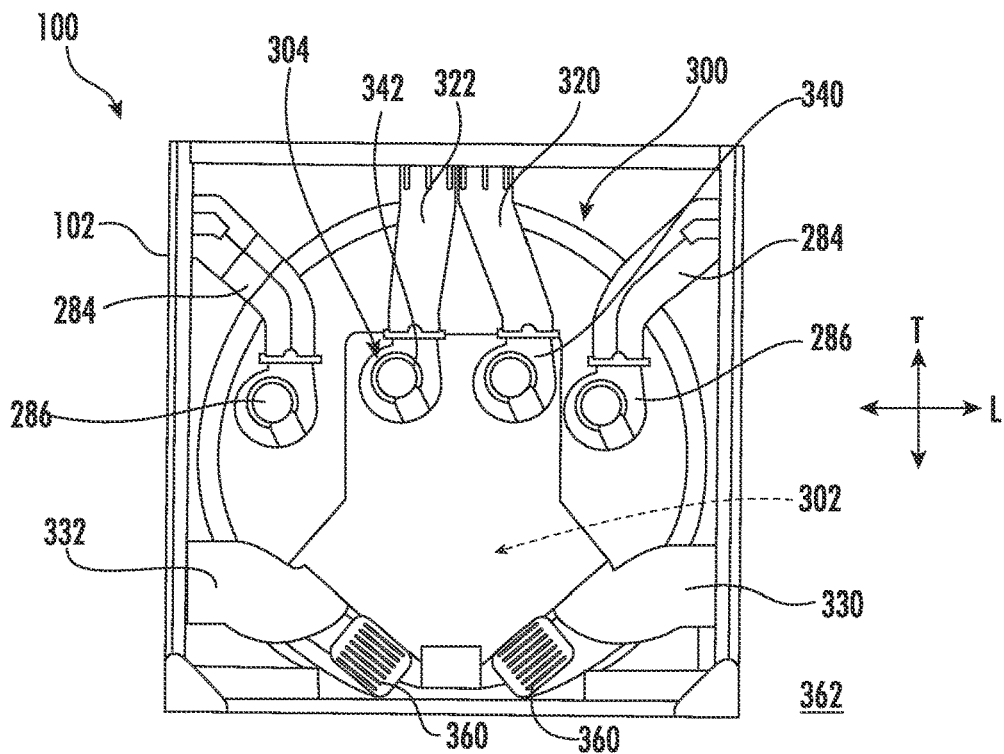
FIG. 10 provides a top view of the exemplary moisture management system of FIG. 9 according to an exemplary embodiment of the present subject matter.
Figure 11:
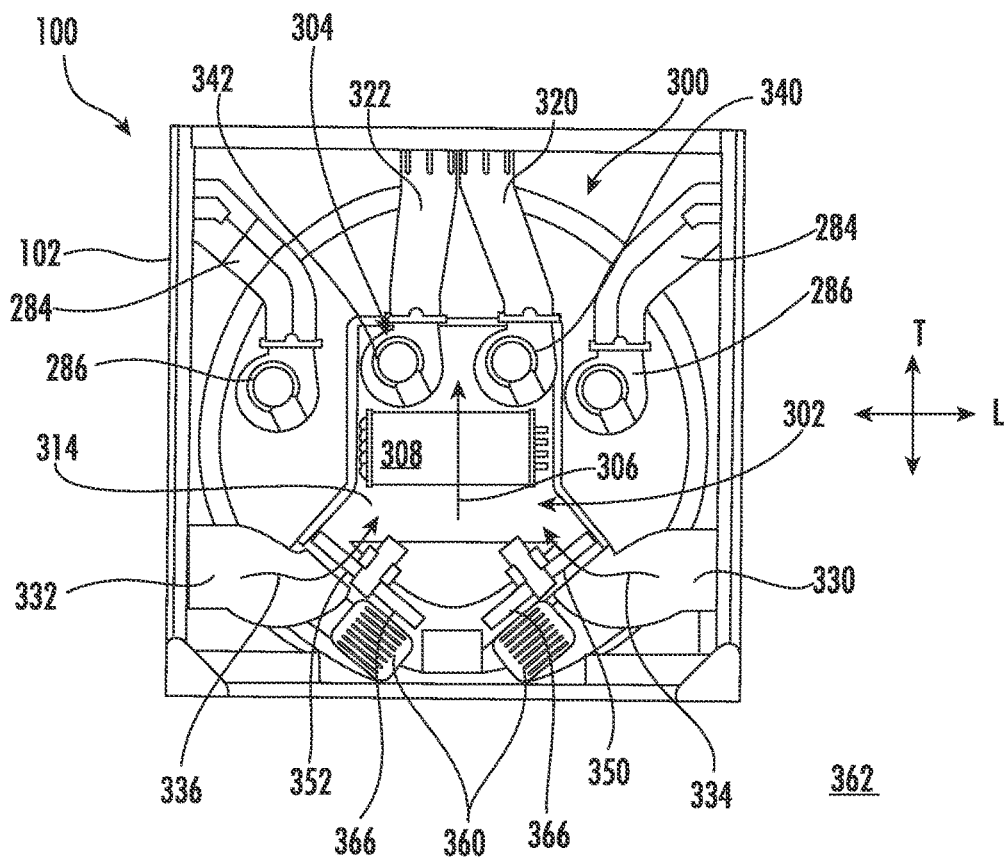
FIG. 11 provides a top view of the exemplary moisture management system of FIG. 9 according to an exemplary embodiment of the present subject matter with an evaporator plenum cover removed.
Figure 12:
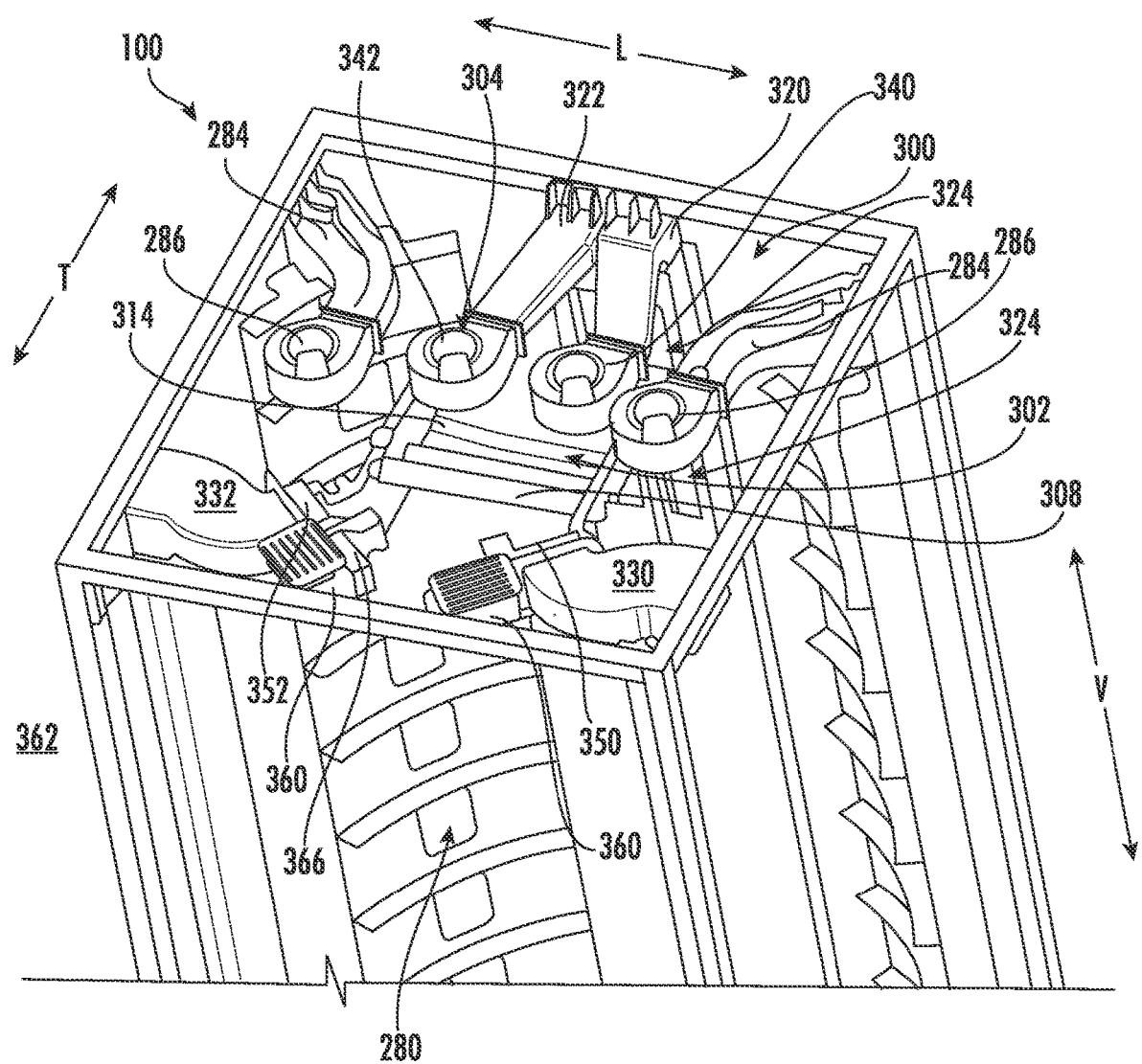
FIG. 12 provides a perspective view of the exemplary moisture management system of FIG. 9 with various components of the gardening appliance removed for clarity according to an exemplary embodiment of the present subject matter.
Figure 13:
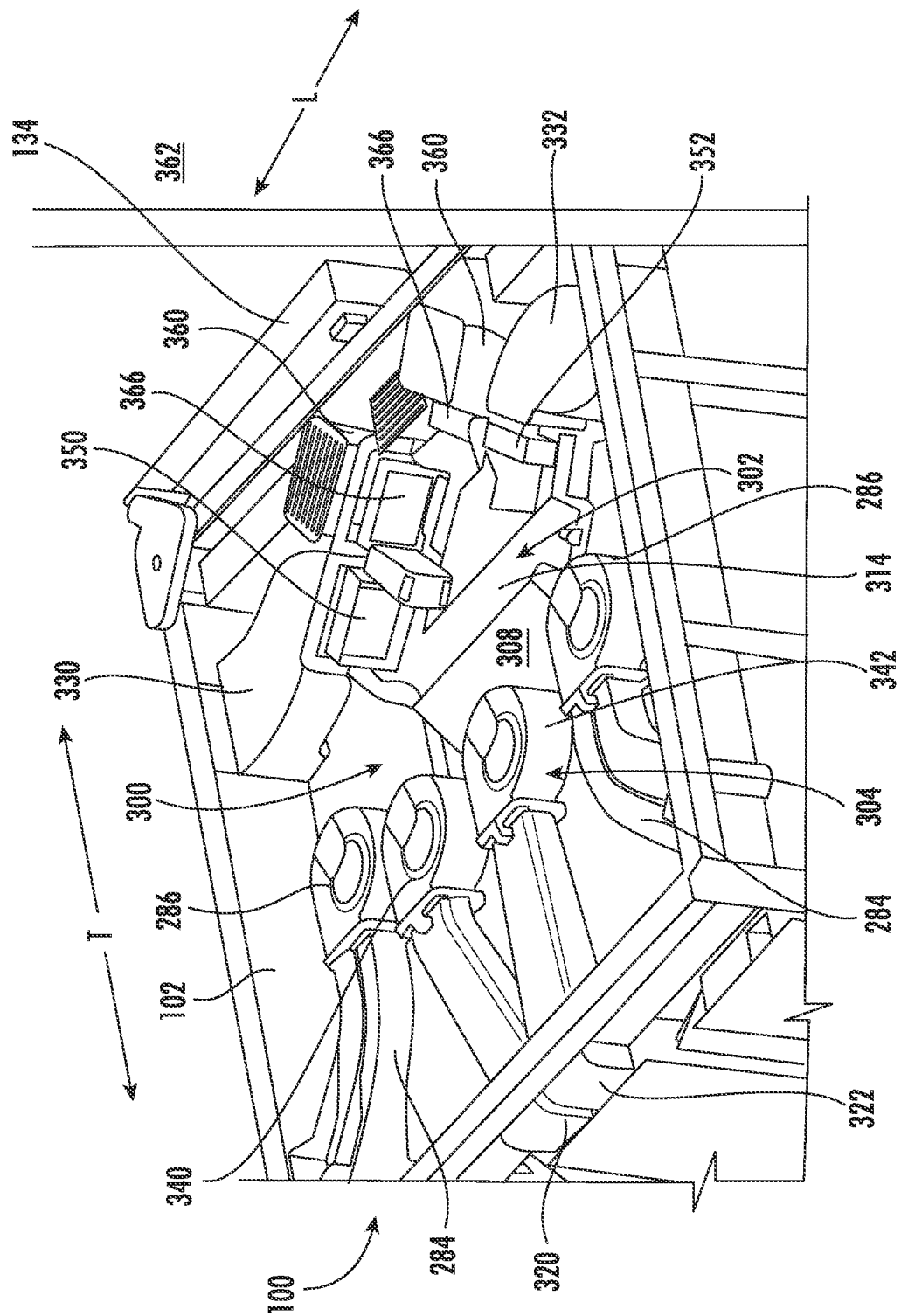
FIG. 13 provides a rear perspective view of the exemplary moisture management system of FIG. 9 according to an exemplary embodiment of the present subject matter.
Figure 14:
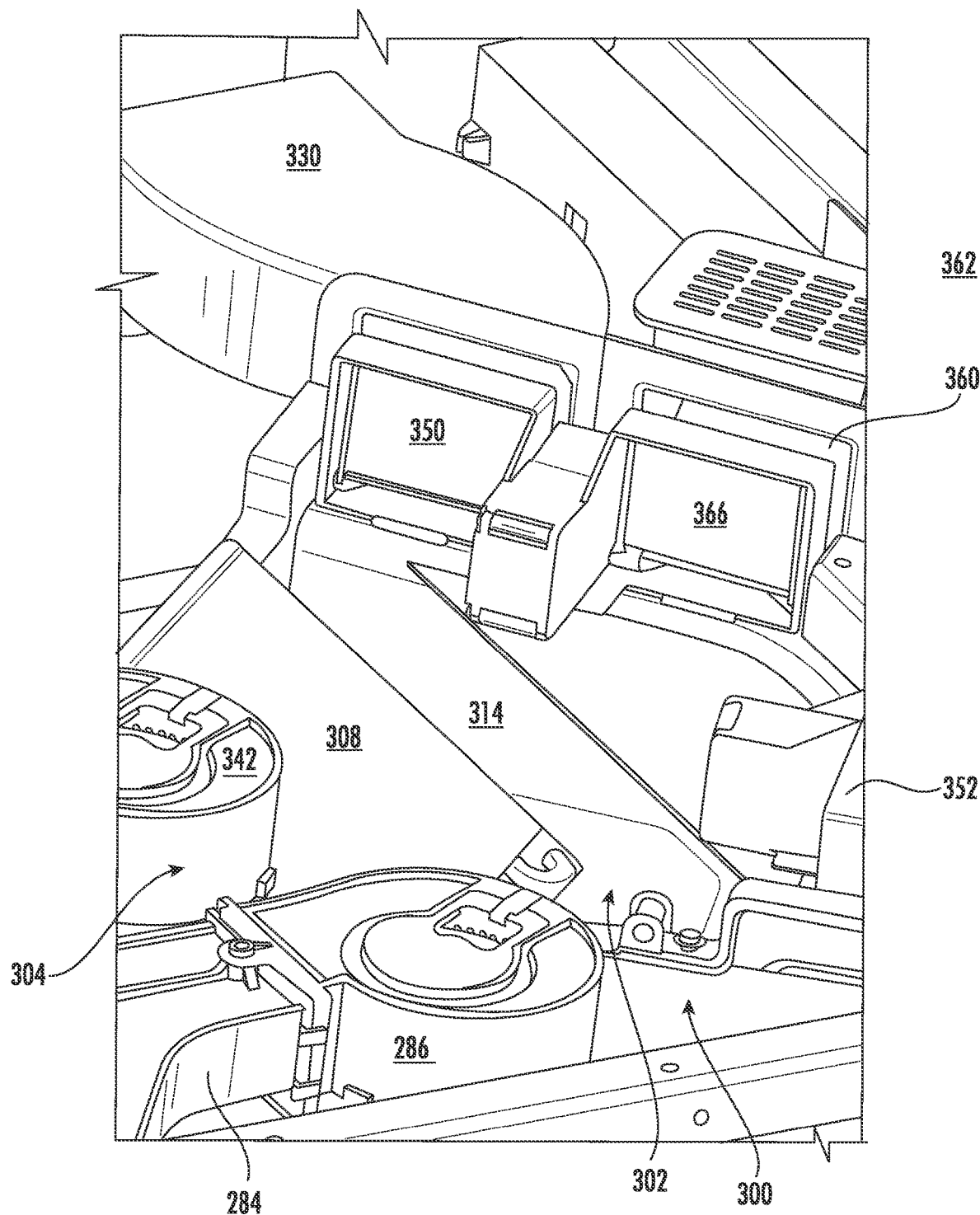
FIG. 14 provides a close-up perspective view of a damper assembly of the exemplary moisture management system of FIG. 9 according to an exemplary embodiment of the present subject matter.
Figure 15:
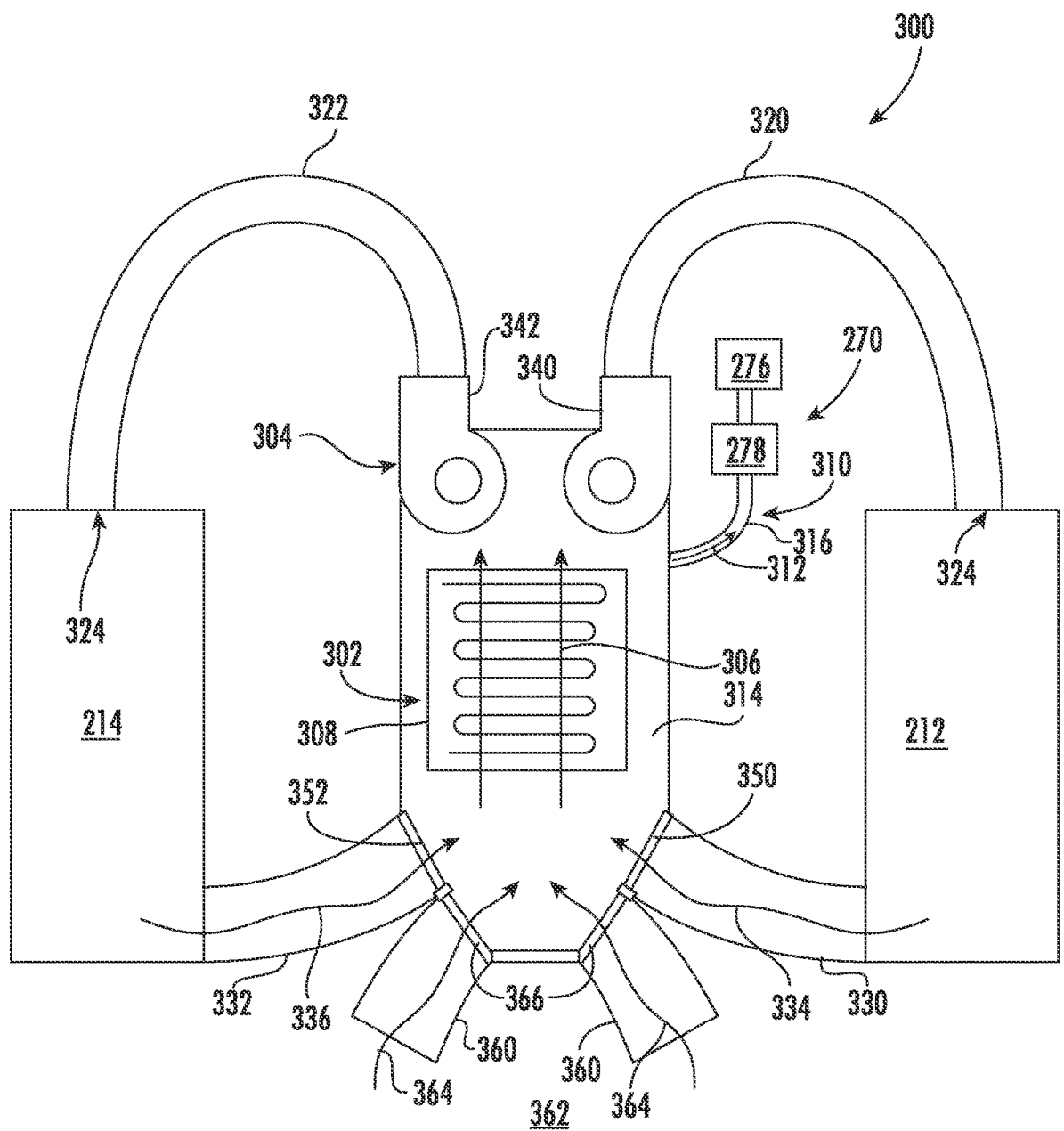
FIG. 15 provides a schematic view of the exemplary moisture management system of FIG. 9 according to an exemplary embodiment of the present subject matter.

Although moisture management system 300 is described herein in the context of gardening appliance 100, it should be appreciated that aspects of the present subject matter may be used to provide hydration and/or nutrients to plants in any other gardening appliance or in any other application where it is desirable to selectively provide desirable quantities and concentrations of hydration and improve humidity control for improved plant growth. FIGS. 9 and 15 provide schematic illustrations of moisture management system 300 to facilitate discussion of aspects of the present subject matter. However, it should be appreciated that variations and modifications may be made to moisture management system 300 while remaining within the scope of the present subject matter.

According to the illustrated embodiment, moisture management system 300 may include an evaporator plenum 302 that is in fluid communication with grow chamber 122. Moisture management system 300 may further include a fan assembly 304 that is operably coupled to evaporator plenum 302 for urging a flow of air (e.g., as identified by reference numeral 306 in FIG. 15) through evaporator plenum 302. An evaporator 308 may be positioned within evaporator plenum 302 for dehumidifying or otherwise selectively extracting water or moisture from the flow of air 306. Notably, this extracted water may be reused by hydration system 270 in a more efficient manner, as described in more detail below. The dehumidified air may then be recirculated into grow chamber 122, e.g., when it is desirable or permissible to reduce the humidity within grow chamber 122. By contrast, if the humidity within grow chamber 122 is suitable or too low, evaporator 308 may be warmed (or not cooled) and the humid air may simply be recirculated into grow chamber 122.

According to the illustrated embodiment, evaporator plenum 302 and evaporator 308 are positioned above grow module 200 along the vertical direction V. However, it should be appreciated that according to alternative embodiments, evaporator plenum 302 may be positioned at any other suitable location. In addition, according to an exemplary embodiment, evaporator 308 may be a part of sealed system 150 of gardening appliance 100. In this regard, compressor 152, condenser 156, and/or expansion valve 158 may all be positioned within mechanical compartment 140 at a bottom of cabinet 102. However, a refrigerant conduit may run refrigerant through evaporator 308 (e.g., similar to evaporator 154 as described above). According to still other embodiments, evaporator 308 may be part of a separate, dedicated sealed system or may be any other suitable device for removing moisture from the flow of air 306.

According to an exemplary embodiment, flow of air 306 may be circulated from a single grow chamber (e.g., grow chamber 122). In this regard, evaporator plenum 302 may be fluidly coupled to only a single grow chamber such that moisture is removed from the flow of air 306 before recirculating the flow of air 306 back into the same grow chamber. However, it should be appreciated that according to alternative embodiments, moisture management system 300 may be used to selectively and independently regulate the moisture levels within numerous grow chambers. For example, the embodiment illustrated in FIGS. 9 through 15 provides for regulation of the humidity within two grow chambers, specifically, first chamber 212 and second chamber 214 as described above and illustrated in FIG. 8. It should be appreciated that aspects of the present subject matter are not limited to humidity regulation within a single chamber or two chambers but could instead include independent regulation of any suitable number and configuration of chambers.

Notably, regardless of the number of chambers that are dehumidified, moisture management system 300 may further include features for reusing the extracted water. Specifically, according to the illustrated embodiment, moisture management system 300 includes a water return path 310 for directing the extracted water (e.g., as shown schematically by reference numeral 312 in FIG. 15) back into hydration system 270 such that it may be reused. For example, water return path 310 may simply be a series of holes or apertures defined within a bottom panel 314 of evaporator plenum 302. In this manner, extracted water 312 may drip off the evaporator 308 and fall under the force of gravity through or around grow module 200 where it may be collected in sump 278. By contrast, water return path 310 may include one or more troughs or channels (not shown) that are defined in a bottom panel 314 for collecting extracted water 312. These troughs may terminate in a conduit (e.g., such as conduit 316) which directs the flow of extracted water 312 directly back into sump 278 or a storage reservoir of hydration system 270.

In this manner, water extracted from the flow of air 306 may be used by hydration system 270 to further hydrate plants 124. This may reduce or eliminate the need for external water sources, municipal water supplies, etc. In addition, moisture management system 300 provides for more efficient usage of water and/or nutrients. It should be appreciated that other means for collecting and/or using extracted water 312 are possible and within the scope of the present subject matter.

Referring again to FIGS. 9 through 15, one embodiment of moisture management system 300 will be described that facilitates moisture management within two or more grow chambers. Specifically, according to the illustrated embodiment, moisture management system 300 includes a first supply duct 320 that provides fluid communication between evaporator plenum 302 and first grow chamber 212. In addition, moisture management system 300 includes a second supply duct 322 that provides fluid communication between evaporator plenum 302 and second grow chamber 214. Specifically, according to the illustrated embodiment, first supply duct 320 and second supply duct 322 extend downward along rear side 114 of cabinet 102 and each include a plurality of discharge apertures 324 that are spaced apart along the vertical direction V for distributing the flow of air 306 into the respective grow chambers 212, 214.

Similarly, moisture management system 300 includes a first intake duct 330 that provides fluid communication between the first grow chamber 212 and evaporator plenum 302. Second intake duct 332 provides fluid communication between second grow chamber 214 and evaporator plenum 302. In this manner, as fan assembly 304 urges a flow of air 306 through evaporator plenum 302, the flow of air 306 passes into first chamber 212 and/or second chamber 214 before being drawn back into evaporator plenum 302 through intake ducts 330, 332. Specifically, a first flow of intake air 334 is drawn from first grow chamber 212 through first intake duct 330, while a second flow of intake air 336 is drawn from second grow chamber 214 through the second intake duct 332.

Fan assembly 304 may generally be any suitable number, type, and position of fans or air handlers suitable for urging a flow of air 306 through evaporator plenum 302. For example, according to an exemplary embodiment, the fan assembly 304 may include a single fan positioned downstream of evaporator 308 of any suitable type or configuration, such as an axial fan, centrifugal fan, tangential fan, etc. According to the illustrated embodiment, the fan assembly 304 includes a first fan 340 operably coupled to first supply duct 320 and a second fan 342 operably coupled to second supply duct 322. Notably, first fan 340 and second fan 342 may be operated independently of each other to selectively urge the flow of air 306 into their respective grow chambers 212, 214. Moreover, according to an exemplary embodiment, first fan 340 and second fan 342 may be configured for operating in reverse when it is desirable to prevent flow of air 306 from entering one of the first chamber 212 and/or second chamber 214. In this regard, operating first fan 340 or second fan 342 in the reverse direction creates a back pressure that prevents or restricts the flow of air 306 from entering first supply duct 320 or second supply duct 322, respectively, such that the flow of air 306 is instead urged through the opposite supply duct 320, 322.

In addition, moisture management system 300 may include a system of dampers to facilitate improved distribution of flow of air 306 within gardening appliance 100. For example, according to the illustrated embodiment, moisture management system 300 includes a first intake damper 350 that is operably coupled to first intake duct 330 for regulating first flow of intake air 334 into evaporator plenum 302. In addition, moisture management system 300 may include a second intake damper 352 that is operably coupled to second intake duct 332 for regulating the second flow of intake air 336 into evaporator plenum 302. In this manner, for example, controller 174 may isolate one grow chamber, e.g., second grow chamber 214 from flow of air 306 by closing second intake damper 352 and operating second fan 342 in the reverse direction at a low speed. Simultaneously, controller 174 may operate first fan 340 and open the first intake damper 350 such that most or all of the flow of air 306 is circulated solely within first chamber 212. It should be appreciated that such operation provides improved versatility, moisture management, and humidity control within the various chambers 212-216.

According to exemplary embodiments, moisture management system 300 may further be configured for drawing in ambient air. For example, if it is particularly humid outside, moisture management system 300 may draw in outdoor air to increase the amount of water or moisture within gardening appliance 100 that may be used by hydration system 270. Specifically, according to the illustrated embodiment, moisture management system 300 may include one or more ambient air intakes 360, e.g., a duct that is fluidly coupled to the outdoors or to the ambient environment 362 outside of cabinet 112. Ambient air intake 360 may be fluidly coupled to evaporator plenum 302 such that a flow of ambient air (e.g., as identified generally by reference numeral 364) may pass into evaporator plenum 302 where water 312 may be extracted.

According to the illustrated embodiment, an ambient damper 366 may be operably coupled to the ambient air intake 360 for selectively permitting or preventing the flow of ambient air 364 from passing into evaporator plenum 302. Notably, according to the illustrated embodiment, moisture management system 300 includes two ambient air intakes 360. However, it should be appreciated that according to alternative embodiments, any other suitable number type and position of ambient air intakes may be used. In addition, it should be appreciated that ambient air intake 360 may include any suitable filtering mechanisms or air treatment systems for treating the flow of ambient air 364 before introducing it into moisture management system 300. In operation, fan assembly 304 may draw into evaporator plenum 302 the first flow of intake air 334, the second flow of intake air 336, and/or the flow of ambient air 364 in any suitable proportions.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A gardening appliance, comprising:
    a liner positioned within a cabinet and defining a first grow chamber and a second grow chamber, the second grow chamber being substantially isolated from the first grow chamber;
    a grow module mounted within the liner and defining a plurality of apertures for receiving one or more plant pods; and
    a moisture management system comprising:
        an evaporator plenum;
        a first supply duct and a first intake duct providing fluid communication between the evaporator plenum and the first grow chamber;
        a second supply duct and a second intake duct providing fluid communication between the evaporator plenum and the second grow chamber;
        a fan assembly operably coupled to the evaporator plenum for urging a flow of air through the evaporator plenum; and
        an evaporator positioned within the evaporator plenum for dehumidifying the flow of air passing through the evaporator plenum.

2. The gardening appliance of claim 1, wherein the fan assembly comprises:
    a first fan operably coupled to the first supply duct; and
    a second fan operably coupled to the second supply duct.

3. The gardening appliance of claim 2, wherein the first fan is selectively operated in reverse to prevent the flow of air from entering the first grow chamber and the second fan is selectively operated in reverse to prevent the flow of air from entering the second grow chamber.

4. The gardening appliance of claim 1, wherein the moisture management system further comprises:
    a first intake damper operably coupled to the first intake duct for regulating a first flow of intake air from the first grow chamber; and
    a second intake damper operably coupled to the second intake duct for regulating a second flow of intake air from the second grow chamber.

5. The gardening appliance of claim 1, wherein the moisture management system further comprises:
    an ambient air intake that is fluidly coupled to the evaporator plenum; and
    an ambient damper operably coupled to the ambient air intake for selectively permitting a flow of ambient air to pass into the evaporator plenum.

6. The gardening appliance of claim 1, further comprising a hydration system for selectively spraying a mist of nutrients into the grow chamber, wherein the hydration system comprises:
    a sump for collecting extracted water from the evaporator; and
    a pump fluidly coupled to the sump for recirculating the extracted water through the hydration system.

7. The gardening appliance of claim 6, wherein the moisture management system comprises:
a water return path for directing the extracted water from the evaporator into the sump.

8. The gardening appliance of claim 1, wherein the evaporator plenum is defined above the grow module along a vertical direction.

9. The gardening appliance of claim 1, wherein the evaporator is operably coupled to a sealed system, the sealed system comprising a condenser, an expansion device, and a compressor.

10. The gardening appliance of claim 1, wherein the gardening appliance further comprises:
a lighting source for selectively illuminating the grow chamber;
a light cooling duct for passing a flow of cooling air over the lighting source; and
a cooling fan for circulating the flow of cooling air from the grow chamber through the light cooling duct.

11. A moisture management system for a gardening appliance, the gardening appliance comprising a liner positioned within a cabinet and defining a first grow chamber and a second grow chamber, the second grow chamber being substantially isolated from the first grow chamber, and a grow module mounted within the liner, the moisture management system comprising:
an evaporator plenum;
a first supply duct and a first intake duct providing fluid communication between the evaporator plenum and the first grow chamber;
a second supply duct and a second intake duct providing fluid communication between the evaporator plenum and the second grow chamber;
a fan assembly operably coupled to the evaporator plenum for urging a flow of air through the evaporator plenum; and
an evaporator positioned within the evaporator plenum for dehumidifying the flow of air passing through the evaporator plenum.

12. The moisture management system of claim 11, wherein the fan assembly comprises:
a first fan operably coupled to the first supply duct; and
a second fan operably coupled to the second supply duct.

13. The moisture management system of claim 12, wherein the first fan is selectively operated in reverse to prevent the flow of air from entering the first grow chamber and the second fan is selectively operated in reverse to prevent the flow of air from entering the second grow chamber.

14. The moisture management system of claim 11, further comprising:
a first intake damper operably coupled to the first intake duct for regulating a first flow of intake air from the first grow chamber; and
a second intake damper operably coupled to the second intake duct for regulating a second flow of intake air from the second grow chamber.

15. The moisture management system of claim 11, further comprising:
an ambient air intake that is fluidly coupled to the evaporator plenum; and
an ambient damper operably coupled to the ambient air intake for selectively permitting a flow of ambient air to pass into the evaporator plenum.

16. The moisture management system of claim 11, further comprising a hydration system comprising for selectively spraying a mist of nutrients into the grow chamber, wherein the hydration system comprises:
a sump for collecting extracted water from the evaporator; and
a pump fluidly coupled to the sump for recirculating the extracted water through the hydration system.

* * * * *